US009732730B2

(12) United States Patent
Friedrich et al.

(10) Patent No.: US 9,732,730 B2
(45) Date of Patent: Aug. 15, 2017

(54) PARTIAL PITCH WIND TURBINE WITH FLOATING FOUNDATION

(71) Applicant: ENVISION ENERGY (DENMARK) APS, Silkeborg (DK)

(72) Inventors: Michael Friedrich, Silkeborg (DK); Anders Varming Rebsdorf, Skanderborg (DK)

(73) Assignee: Envision Energy (Denmark) ApS, Silkeborg (DK)

( * ) Notice: Subject to any disclaimer, the term of this patent is extended or adjusted under 35 U.S.C. 154(b) by 733 days.

(21) Appl. No.: 14/149,066

(22) Filed: Jan. 7, 2014

(65) Prior Publication Data

US 2014/0219797 A1 Aug. 7, 2014

(30) Foreign Application Priority Data

Jan. 15, 2013 (DK) ................................. 2013 70022

(51) Int. Cl.
*F03D 7/02* (2006.01)
*F03D 7/04* (2006.01)
(Continued)

(52) U.S. Cl.
CPC ......... *F03D 7/0224* (2013.01); *F03D 7/0228* (2013.01); *F03D 7/04* (2013.01);
(Continued)

(58) Field of Classification Search
CPC ........ F03D 7/0224; F03D 7/0228; F03D 7/04; F03D 13/20; F03D 13/22; F03D 7/0236; F03D 7/024; F03D 13/25; F05B 2240/93
See application file for complete search history.

(56) References Cited

U.S. PATENT DOCUMENTS

| 8,022,566 B2 * | 9/2011 | Loh ........................ F03D 7/0224 290/44 |
| 2007/0212209 A1 * | 9/2007 | Borgen ................. F03D 7/0204 415/1 |

(Continued)

FOREIGN PATENT DOCUMENTS

| CN | 102758722 | 10/2012 |
| EP | 2489872 | 8/2012 |

(Continued)

OTHER PUBLICATIONS

Search Report including English translation for Korean Patent Application No. 10-2013-0153088, dated Dec. 30, 2014, 8 pages.

(Continued)

*Primary Examiner* — Richard Edgar
*Assistant Examiner* — Jesse Prager
(74) *Attorney, Agent, or Firm* — James Creighton Wray; Meera P. Narasimhan

(57) ABSTRACT

The present invention relates a wind turbine comprising a wind turbine tower with a nacelle provided on the top to which a rotor hub with one or more wind turbine blades is rotatably mounted so that they form a rotor plane. A floating foundation having a upper section is mounted to the bottom of the wind turbine tower, wherein the foundation has a buoyant body configured to be installed at an offshore position having a water depth of about 40 m or more. The wind turbine blade comprises an inner blade section coupled to an outer blade section by a pitch junction in which a pitch mechanism is coupled to a pitch control system configured to regulate the pitch of the outer blade section relative to the inner blade section at wind speeds above a first wind speed. This allows the pitching to be used to counteract the tilting of the wind turbine caused by the different thrusts acting on the structure. This allows for a more linear control of the bending moment induced in the structure, since the blade (Continued)

sections provides a more constant thrust acting on the rotor hub which in turn allows the large negative damping loads and stresses introduced in the wind turbine to be eliminated.

11 Claims, 3 Drawing Sheets

(51) Int. Cl.
    *F03D 13/20*     (2016.01)
    *F03D 13/25*     (2016.01)
    *B63B 35/44*     (2006.01)

(52) U.S. Cl.
    CPC .............. *F03D 13/22* (2016.05); *F03D 13/25* (2016.05); *B63B 2035/442* (2013.01); *F05B 2240/93* (2013.01); *Y02E 10/721* (2013.01); *Y02E 10/723* (2013.01); *Y02E 10/727* (2013.01)

(56) References Cited

U.S. PATENT DOCUMENTS

| | | |
|---|---|---|
| 2012/0288371 A1 | 11/2012 | Grabau et al. |
| 2012/0294723 A1 | 11/2012 | Grabau et al. |
| 2015/0147174 A1* | 5/2015 | Couchman .............. F03D 7/047 416/1 |

FOREIGN PATENT DOCUMENTS

| | | |
|---|---|---|
| GB | 2442718 A | 4/2008 |
| WO | WO 03/004869 | 1/2003 |
| WO | WO 2005/090781 A1 | 9/2005 |

OTHER PUBLICATIONS

Search Report prepared by Danish Patent and Trademark Office on Aug. 29, 2013, for Application No. PA 2013 70022.

* cited by examiner

PARTIAL PITCH WIND TURBINE WITH FLOATING FOUNDATION

CROSS-REFERENCE TO RELATED APPLICATIONS

This application claims the benefit of Danish Application No. PA 2013 70022 filed Jan. 15, 2013, the entire disclosure of which is incorporated herein by reference.

FIELD OF THE INVENTION

The present invention relates a wind turbine comprising a wind turbine tower having a top and a bottom; a nacelle provided on top of the wind turbine tower; a rotor hub rotatably mounted on the nacelle; one or more wind turbine blades mounted to the rotor hub, wherein the wind turbine blades form a rotor plane; and a floating foundation having a upper section configured to be mounted to the bottom of the wind turbine tower, wherein the foundation has a buoyant body and is configured to be installed at an offshore position having a predetermined water depth.

The present invention also relates to a method of controlling a wind turbine, comprising one or more wind turbine blades mounted to a rotor hub which in turn is rotatably mounted to a nacelle provided on top of a wind turbine tower which in turn is mounted to a floating foundation having a buoyant body, wherein the wind turbine blades are pitched at mean wind speeds above a first wind speed.

BACKGROUND OF THE INVENTION

It is known to install wind turbines onshore or offshore at locations allowing the wind turbine to produce as much energy as possible typically by arranging them in groups. During the recent years, the height and size of the wind turbines have increased together with the maximum power output capable of being produced by these large wind turbines. As the power output is proportional to the size and length of the wind turbine blades, these have also increased in size and length as well as the height of the wind turbine tower. Today, there is an increasing demand for placing such large wind turbines at offshore locations due to noise limitations and other factors.

Offshore wind turbines are normally installed on an offshore foundation (sometimes called near-shore foundation) secured to the seabed either by a monopole driven into the seabed or a gravity or tripod foundation placed on the seabed. Such foundations are, however, expensive and only usable in waters having a depth of about 40 m or less. A floating foundation having one or three buoyancy chambers is normally used for deeper waters; however, such floating foundations are typically very expensive and are often very large and bulky as they have to provide a stable platform for the wind turbine. The thrust of the wind (sometimes called the wind thrust or rotor thrust) acting on the rotor plane depends on the density of the incoming wind and is an important factor when determining the size and weight of such a floating foundation, i.e. the floating element.

Offshore wind turbines are subjected to a wind profile which differs from the wind profile over land. The offshore wind profile has mean wind speeds which are more constant and often higher than an onshore wind profile. The onshore wind profile often suffers from wind shears and turbulences which reduces the mean wind speed. Furthermore, a floating foundation is also subjected to thrusts from marine current and wave movements and the hydrostatic thrust acting on the submerged part of the foundation. The tilting or angular rotation of the wind turbine which causes the wind turbine to oscillate due to the various thrusts acting on the structure becomes a main issue at wind speeds over 10 to 14 m/s, e.g. 12 m/s (also called rated power).

Stall regulated wind turbines are sensitive to the density of the incoming wind which changes during summer and winter and at rated power at a certain wind speed, turbulence will occur on the upwind side of the blade, inducing stalls, and thereby an increasingly amount of loads and vibrations. Such wind turbines are therefore very large, heavy and expensive solutions for offshore use and are therefore not a preferred as solutions. Furthermore, the thrust or load from the wind acting on such a wind turbine influences the rated power situation which may lead to turbulence around the wind turbine blades. This subjects the wind turbine to significant storm loads and stresses, causing the wind turbine to fail. At extreme high wind speeds or wind gusts the loads and stresses experienced by the wind turbine will increase exponentially. This requires the wind turbine to be constructed or rated so that it can withstand such high loads and stresses. In order to achieve these rating requirements defined by IEC, the wind turbine manufacturers typically add reinforcing materials and/or increase the size and strength of various parts of the structure. This in turn increases the production costs of such a wind turbine. Such a wind turbine does not allow the efficiency of the wind turbine to be controlled.

Pitch-regulated wind turbines for offshore use normally pitch the entire wind turbine blade into or out off the wind so that it maintains a relative constant power output in the rated power situation. When the wind turbine blades are pitched out of the wind, the thrust acting on the rotor hub is reduced, and when the wind turbine blades are pitched into the wind the thrust increases. This causes the wind turbine to repetitively tilt or rotate angularly relative to the centre of gravity of the structure which is a major problem when the wind turbine is placed on a floating foundation. As the wind turbine tilts towards the wind it will induce an additional wind thus increasing the relative wind hitting the rotor plane. As the wind turbine tilts backwards away from the wind it will move with the wind thus decreasing the relative wind hitting the rotor plane. This means that if the wind turbine is placed on a floating foundation it will see a repetitive change in the relative wind hitting the wind turbine even if the wind speed of the incoming wind is constant. These negative damping oscillations could have a significant self-enhancing effect on the wind turbine which may overturn the structure or lead to a failure in the structure.

Furthermore, the hydrodynamics and cyclic thrust acting on the floating foundation due to the marine current and waves may also cause the structure to repetitively tilt or rotate angularly relative to the centre of gravity of the structure. This could also have a self-enhancing effect on the structure if the marine natural frequencies substantially match that of the thrust acting on the rotor hub. This oscillation movement of the wind turbine leads to significant stresses and fatigue loads in the structure which requires the wind turbine, in particular the tower, to be reinforced with additional materials so that the structural strength is increased. This in turn increases the production costs of the wind turbine. One way of solving this tilting problem is to increase the size and weight of the floating foundation; however this solution increases the production costs of the floating foundation, thus making it a very expensive solution. This solution may also increase the installation costs due to the increased size and weight of the floating foundation.

WO 03/004869 A1 discloses a wind turbine with three traditional wind turbine blades installed on a floating foundation which is secured to the seabed by a number of anchoring cables. The floating foundation comprises a buoyant chamber formed inside the body of the foundation which allows the foundation to float near the water surface. The buoyant chamber may in one embodiment comprise a number of ballast chambers where the ballast can be adjusted in order to compensate for the tilting of the wind turbine. A weight placed on a movable lever arm at the bottom of the foundation or a tension system, e.g. combined with a pole contacting to the seabed, may be used instead of adjusting the ballast in the ballast chambers. All the disclosed embodiments describe a relatively complex and expensive solution coupled to the floating foundation which increases the size and overall costs of the foundation. Furthermore, the adjustment of the ballast in the different chambers is not considered to provide an acceptable solution, since movement of the ballast between the different chambers takes time and may even start to resonate with the repetitive tilting of the wind turbine.

U.S. Pat. No. 7,156,037 B2 discloses another solution where a wind turbine with three traditional wind turbine blades is installed on an elongated buoyant foundation pivotally secured to the seabed. The foundation comprises a ballast room partly filled with water. The nacelle is coupled to the top of the tower using a tilting joint which tilts the position of the rotor hub so that the rotor axle is always positioned in a horizontal position. An anchoring cable connected to a platform placed on the seabed or three anchoring cables connected to the wind turbine are used to stabilize the wind turbine. This solution has the disadvantage that the tip of the wind turbines may risk hitting the tower when the tower is tilted backwards. This configuration allows for a relatively large tilting movement of the wind turbine which results in relatively large changes in the relative wind speed hitting the rotor plane. The tilting joint furthermore provides a weak point which is likely to fail.

WO 2012/069578 A1 discloses a pitch-regulated wind turbine installed on a floating foundation secured to the seabed by a number of anchoring cables. The foundation comprises one to four buoyant chambers partly filled with ballast and a number of stabilizing arms extending outwards from the foundation. A rotatable propeller is arranged at the bottom of each buoyant chamber and coupled to a control system which controls the operation and direction of the propellers. An accelerometer or a GNSS receiver in form of a GPS receiver is used to measure the oscillation of the wind turbine where the propellers are used to provide a movement in the opposite direction so that the oscillations are dampened. This solution requires the use of a propeller system to provide a relative stable platform for the wind turbine which adds to the complexity and size of the floating foundation, thus increasing the overall costs. Furthermore, this solution requires the use of a number of stabilizing arms or three or more buoyant chambers to compensate for the movement or rotation of the foundation caused by the current and waves.

All these solutions require the use of an additional system to be either coupled to the exterior of the floating foundation or placed inside the floating foundation to counteract the repetitive tilting of the wind turbine.

WO 2005/090781 A1 discloses a floating wind turbine which at the bottom of the wind turbine tower is connected to an anchor located on the seabed. The wind turbine comprises three traditional blades connected to a pitch control system which regulates the pitch angle of the blades according to a mean thrust force acting on the rotor hub for counteracting the movement of the tower. The control system regulates the pitch angle of the wind turbine blades to counteract for the movement of the structure; this places the wind turbine blades in a non-optimal position relative to the wind direction. This decreases the thrust acting on the rotor hub, but also reduces the efficiency of the system. The tower of this three-bladed wind turbine experiences very high loads during a high wind standstill which could lead to a dangerous angular movement of the tower during the standstill.

The thesis "Model-based control of a ballast-stabilized floating wind turbine exposed to wind and waves" of Soeren Christiansen discloses various control methods for controlling a wind turbine placed on a floating foundation. The control methods are based on a 5 MW wind turbine (called Hywind) with three traditional blades placed on a foundation shaped as a spar buoy which is anchored to the seabed using tensioning wires. Paper C of this thesis discloses a control method where the three blades are pitched according to the minimum thrust acting on the rotor hub. However, the structural strength of the main rotor shaft and the drive train need to be increased, since the reduced generator speed causes the generator torque to increase. Paper D discloses another control method utilising a traditional onshore controller for controlling the pitch angle of the blades. This control method requires an additional control loop for stabilising the platform and the entire system. This adds to the complexity and costs of the wind turbine structure.

OBJECT OF THE INVENTION

An object of this invention is to provide a wind turbine configuration that allows the tilting of the wind turbine to be reduced at high operating wind speeds.

An object of this invention is to provide a floating foundation having a reduced size and weight.

An object of the invention is to provide an alternative way of regulating the pitch of a pitchable wind turbine blade operating at high wind speeds.

An object of this invention is to provide a wind turbine configuration that allows the fatigue loads in the structure to be reduced at high wind speeds in operation.

DESCRIPTION OF THE INVENTION

An object of the invention is achieved by a wind turbine mounted to a floating foundation characterised in that
the wind turbine blade comprises at least an inner blade section with a first aerodynamic profile and an outer blade section with a second aerodynamic profile, wherein the inner blade section is mounted to the rotor hub and the outer blade section is coupled to the inner blade section by at least one pitch junction which is configured to pitch the outer blade section relative to the inner blade section at wind speeds above a first wind speed.

This provides a partial pitch wind turbine configuration suitable for deep water applications. The two blade sections allow at least one of the blade sections, e.g. the outer section, to be pitched relative to the other blade section, e.g. the inner section. The pitching system is configured to regulate the pitching for improving the power performance of the wind turbine and/or reduce the relative variations of the thrust value acting on the rotor hub. This reduces the fatigue loads and stresses induced in the structure which in turn allows the structural strength and the materials of the wind turbine, e.g. the wind turbine tower and yaw bearing, to be minimised, thereby reducing the production costs of the wind turbine.

The use of a partial pitch wind turbine allows the tilting movement of the structure to be reduced and allows for a more linear control of the bending moment induced in the structure due to the size and weight of the nacelle and the wind turbine blades. This is achieved by pitching only a section of the wind turbine blade which in turn provides a more constant thrust acting on the rotor hub and thus the nacelle than a traditional pitch-regulated wind turbine. This allows the large negative damping loads and stresses introduced in the wind turbine due to the pitching to be eliminated or at least significantly reduced. The maximum allowable tilting of the wind turbine may be ±2°, ±1°, ±0.5° or less. The pitching of the outer blade section relative to the inner blade section allows the bending moment to be reduced. This in turn provides a more stable platform for the wind turbine which in turn allows the size and weight of the floating foundation to be optimised or reduced, thereby reducing the production costs of the floating foundation. This configuration furthermore eliminates the need for any damping mechanisms to be installed at the top of the wind turbine tower which otherwise would add to the cost of the wind turbine. Furthermore, the use of only two wind turbine blades significantly reduces the loads experienced by the wind turbine tower during a high wind standstill compared to the use of three blades; this reduces the risk of a dangerous angular movement of the tower.

The wind turbine blade may have a length from root end to the tip end of 35 m or more corresponding to a relative length of 1. The pitching of at least one of the blade sections allows for a more even distribution of the fatigue loads and stresses induced in the wind turbine blade than a traditional pitch-regulated wind turbine. This enables the size and weight of the pitching system to be optimized or reduced, since the total size and weight of the pitchable part is reduced. In a traditional pitch-regulated wind turbine the entire wind turbine blade is pitched which requires a large and stronger pitch system. The use of a partially pitchable wind turbine blade may allow for a faster and better control of the pitching which may induce less vibration and stresses in the wind turbine blade and in the structure.

According to one embodiment, the inner blade section has a stall-controlled aerodynamic profile and the outer blade section has a pitch-controlled aerodynamic profile, and wherein the two blade sections define a resultant thrust value acting on the rotor hub.

The use of a partial pitch wind turbine allows for a better and more effective control of the resultant thrust or force acting on the rotor hub than a traditional pitch-regulated wind turbine. This allows the aerodynamic profile of each blade section to be optimized according to a predetermined set of specifications which in turn allows for a more optimal regulation of the resulting thrust. The two blade sections may have the same aerodynamic profile or different aerodynamic profiles. The inner blade section may be configured to have a stall-controlled aerodynamic profile which provides a thrust value having the characteristics of a passive or active stall-controlled blade profile relative to the wind speed acting on the wind turbine. The outer blade section may be configured to have a pitch-controlled aerodynamic profile which provides a thrust value having the characteristics of a pitch-controlled blade profile relative to the wind speed acting on the wind turbine. The two blade sections may alternatively have the same aerodynamic profile, e.g. stall- or pitch-controlled, and may be optimized according to the same set or different sets of specifications. The two blade sections define a resultant thrust value for the entire wind turbine blade. The profile of the inner blade section may be configured after the profile of the outer blade section so that the resultant thrust value is substantially constant at wind speeds between the rated wind speed and the cut-off wind speed. This enables the thrust to be regulated passively.

According to one embodiment, the inner blade section extends from a root end of the wind turbine blade to a position of the pitch junction, and the outer blade section extends from a tip end of the wind turbine blade to the position of the pitch junction, and wherein the pitch junction is positioned at a relative length between 0.20 and 0.50±10% relative to the root end, preferably between 0.30 and 0.40±10%.

This allows the length of each blade section and thus the position of the pitch junction to be optimized. The total swept area is distributed between the blade sections so that they define an inner swept area and an outer swept area. The relative length of the inner blade section may be increased relative to the length of the outer blade section, or vice versa. The ratio between the outer swept area relative to the inner swept area may be increased. This allows for a more dynamic control of resultant thrust acting on the rotor hub, since the second thrust value contributes more to the resultant thrust value. The ratio between the outer swept area relative to the inner swept area may be decreased. This allows for a more static resultant thrust acting on the rotor hub, since the second thrust value contributes less to the resultant thrust value. In order to further improve the control of the resultant thrust, at least one intermediate blade section may be arranged between the two blade sections via two junctions. The intermediate blade section may be configured as a pitchable blade section coupled to the two blade sections by at least one pitch junction. The two pitchable blade sections may be pitched together and/or relative to each other via the same pitch control system or two separate pitch control systems.

The inner blade section may have a relative length between 0.20 and 0.80, preferably between 0.30 and 0.70. The outer blade section may have a relative length between 0.20 and 0.80, preferably between 0.30 and 0.70. The relative length of the pitch junction may depend on the desired configuration and may be 0.02 or less. The cited relative lengths may have a tolerance of ±10%, ±5%±2%, or ±1%.

According to one embodiment, the aerodynamic profile of the inner blade section defines a first surface area which defines both the suction side and the pressure side of that blade section, where the aerodynamic profile of the outer blade section defines a second surface area which defines both the suction side and the pressure side of that blade section, and wherein a ratio between the first surface area relative to the second surface area is between 0.5 and 1.5±10%, preferably 1±10%.

This allows the surface area of the two blade sections and thus the lift force and the drag force of each blade section to be optimized. The surface area of the inner blade section may be increased relative to the outer blade section so that the incoming wind hits a larger surface area and thus increases the lift force of the inner blade section. This allows greater loads to be transferred to the inner blade section, reducing the resulting root moment and stresses in the wind turbine blade. This allows the configuration and structural requirement of the wind turbine to be optimized according to the reduced root moment. The surface area of the outer blade section may be reduced relative to the inner blade section so that the incoming wind hits a smaller surface area, thus reducing the lift force and drag force of the outer blade section. This allows the loads and stresses in the outer blade section to be reduced and allows the root moment in the wind turbine blade to be reduced.

The thickness distribution and/or chord distribution of the inner blade section and/or the outer section may be optimized or increased so that the surface area of that blade section is increased. The ratio between the first surface area relative to the second surface area may be between 0.5 and 0.75, e.g. 0.5, which allows the resultant thrust value to have a relatively small negative tangent as the wind speed increases towards the cut-off wind speed. The ratio may be between 0.75 and 1.25, e.g. 1, which allows the resultant thrust value to have a relatively small positive tangent as the wind speed increases towards the cut-off wind speed. The ratio may alternatively be between 1.25 and 1.5, e.g. 1.5, allowing the positive tangent of the resultant thrust value to be increased. The cited ratios may have a tolerance of ±10%, ±5%, ±2%, or ±1%.

According to one embodiment, the pitch control system is configured to regulate the pitch angle of the outer blade section according to a predetermined power output.

The pitch control system may be configured to regulate the pitch angle of the outer bade section according a selected power output profile, such as an increasing power output profile, a decreasing power output profile or a constant or nominal power output profile. This allows the outer blade section to be placed in an optimal relative to the incoming wind so that the efficiency of the wind turbine is increased.

According to a specific embodiment, the wind speed acting on the inner blade section defines a first thrust value and the wind speed acting on the outer blade section defines a second thrust value, and wherein the pitch control system is configured to regulate the second thrust value relative to the first thrust value by pitching the outer blade section so that the resultant thrust value is maintained at a substantially constant value.

The pitching of the partial pitch wind turbine may be configured so that the resultant thrust value acting on the rotor hub is maintained at a substantially constant value for wind speeds above a first wind speed. The inner blade section may define a reference thrust value which is used as a reference parameter for the pitching of the outer blade section. The dynamic thrust value of the outer blade section may be regulated relative to the reference value so that the resultant thrust value is maintained at a substantially constant value. The pitching of the outer blade section may allow the bending moment to be maintained at a substantially minimum at the various operating wind speeds. The power output using this control method may be lower than the control method described above, since a part of the generated power is used to pitch the outer blade section more frequently.

The resultant thrust value may be regulated to within an acceptable tolerance of the constant value, e.g. ±10%, ±5%, ±2%, ±1% or less. The constant value may be determined at the rated or nominal wind speed of the wind turbine and may be between 80 and 120%, preferably between 90 and 110%, of the resultant thrust value at that wind speed.

According to one embodiment, the pitch control system is electrically coupled to at least one measuring unit which is configured to measure the tilting of the wind turbine relative to its vertical position, and wherein the pitch control system is configured to regulate the pitch of the outer blade section based on the measured tilt.

This allows the pitching to be further regulated based on the measured tilt of the wind turbine. One or more measuring units, such as an accelerometer, a GPS unit, an angular sensor or another suitable measuring unit, may be arranged at the nacelle or the floating foundation and may be electrically coupled to the pitch control system. One or more strain gauges or other suitable load sensors may alternatively be arranged on the structure, e.g. the tower or the nacelle, and may be used to measure the tilt of the tower. The pitch control system may be configured to regulate the pitch at a predetermined frequency band so that the pitching does not resonate with the structure. This allows the oscillation of the wind turbine to be dampened or reduced to an acceptable level. One or more measuring units, e.g. an anemometer or meteorological mast, a tachometer or another suitable measuring unit, may be coupled to the pitch control system and may be configured to measure the wind speed and/or the rotor speed of the drive train. The pitching may be regulated based on the tilt of the wind turbine and/or the wind speed hitting the rotor plane so that the wind turbine compensates for not only for the thrust induced by the wind speed but also the thrusts induced by the marine currents and waves. This allows the pitching to be regulated based on one or more measured load parameters and/or meteorological data.

According to one embodiment, the first wind speed has a mean value of 10 to 14 m/s, e.g. 12 m/s or more.

The use of a partial pitch wind turbine becomes particularly effective at mean wind speeds of 10 to 14 m/s, e.g. 12 m/s or more, at which the pitch-regulated outer blade section may be used to compensate for the negative effect of the stall-regulated inner blade section. The first wind speed defines the rated power for the wind turbine. The first wind speed may be defined as the wind speed at which the wind turbine reaches its nominal or rated power out. If the wind speed exceeds the cut-off wind speed, e.g. 25 m/s or more, the wind turbine activates its extreme load procedure.

The object of the invention is also achieved by a method of controlling a wind turbine, characterized by regulating the pitch of an outer blade section of the wind turbine blade relative to an inner blade section of the wind turbine.

This method provides a better and more effective control of the thrusts or forces acting on the wind turbine than a traditional pitch-regulated wind turbine. This allows the repetitive tilting of the wind turbine to be eliminated or at least significantly reduced or dampened which reduces the fatigue loads and stresses induced in the structure. The structural strength and the materials of the wind turbine, e.g. the wind turbine tower, may then be reduced, thus reducing the production costs of the wind turbine. The method also provides a better and more effective control of the bending moment induced in the structure when the wind turbine is tilting. This allows for the bending moment to be reduced since the maximum tilting angle of the wind turbine is reduced to a more acceptable level. This in turn increases the stability of the platform for the wind turbine which in turn allows the size and weight of the floating foundation to be optimised or reduced, thus reducing the production costs of the floating foundation. The pitching of the outer blade section allows the tilting of the wind turbine to be reduced and eliminates the need for a dampening mechanism located in the top of the wind turbine tower, thus reducing the costs of the wind turbine. The use of a partial pitch wind turbine allows the power performance and/or thrust acting on the rotor hub to be regulated more precisely since at least one of the blade sections is pitched relative to at least one other blade section.

According to one embodiment, the pitching is regulated relative to a predetermined power output.

The outer blade section is pitched relative to the inner blade section to regulate the power out of the wind turbine. This may be done according to a selected power output profile so a high efficiency is maintained. This also reduced the pitching activity, since the pitch joint is activated according to the changes in the mean wind speed. This also reduces the wear of the pitch joint, thereby increasing the lifetime.

According to one embodiment, the inner blade section defines a first thrust value and the outer blade section defines a second thrust value, wherein the pitching is regulated relative to the first thrust value so that the resultant thrust value is maintained at a substantially constant value.

The outer blade section may instead be pitched relative to the inner blade section so that the resultant thrust value acting the rotor hub is maintained at the substantially constant value. The inner blade section may define a reference thrust value used as a control parameter for the pitching of the outer blade section. This allows the dynamic thrust of the outer blade section to be regulated relative to the reference value in order to maintain a substantially constant value. The resultant thrust value may be regulated to within an acceptable tolerance of the constant value, e.g. ±10%, ±5%, ±2%, ±1% or less. The constant value may be determined at the rated or nominal wind speed of the wind turbine and may be between 80 and 120%, preferably between 90 and 110%, of the resultant thrust value at that wind speed. The pitching of the outer blade section may further be used to compensate for the tilting of the wind turbine due to the marine currents and waves. The outer blade section is pitched so that the tilting of the wind turbine and thus the angle of rotation is reduced or dampened to a more acceptable level, such as ±2°, ±1°, ±0.5° or less relative to its vertical position. This allows the resultant thrust value to be regulated actively. This also increases the pitching activity, since the pitch joint is activated according to changes in the mean wind speed as well as in the dynamic impacts from the marine waves and current.

According to one embodiment, at least one measuring unit arranged on the structure measures the tilting of the wind turbine, and wherein the pitching of the outer blade section is regulated based on the measured tilt.

This allows the pitching of the outer blade section to be regulated based on the measured tilt of the wind turbine. The tilting may be measured using one or more measuring units, such as an accelerometer, a GPS unit, an angular sensor or another suitable measuring unit electrically coupled to the pitch control system. Alternatively one or more strain gauges or other suitable load sensors may measure the tilt of the tower. The pitching may be performed at a selected frequency band so that the pitching does not resonate with the structure. This allows the oscillation of the wind turbine to be dampened or reduced to an acceptable level. One or more measuring units, e.g. an anemometer or meteorological mast, a tachometer or another suitable measuring unit may measure the wind speed and/or the rotor speed. This allows the pitching to be regulated based on the tilt of the wind turbine and/or the wind speed hitting the rotor plane so that the wind turbine is able to compensate for not only the variations in the wind speeds but also for the tilting induced by the marine currents and waves.

DESCRIPTION OF THE DRAWING

The invention is described by example only and with reference to the drawings, wherein.

In the following text, the figures will be described one by one and the different parts and positions seen in the figures will be numbered with the same numbers in the different figures. Not all parts and positions indicated in a specific figure will necessarily be discussed together with that figure.

DETAILED DESCRIPTION OF EMBODIMENTS OF THE INVENTION

The term "tilting" is defined as the rotational movement of the wind turbine relative to a rotation point in at least one predetermined direction. The tilting movement may refer to the rolling of the wind turbine around the x-axis (in parallel with the wind direction). The tilting movement may alternatively or additionally refer to the yawing of the wind turbine around the z-axis (in parallel with the longitudinal direction of the wind turbine tower). The tilting movement may alternatively or additionally refer to the pitching of the wind turbine around the y-axis (perpendicular to the wind direction and the longitudinal direction of the wind turbine tower).

Figure 1:
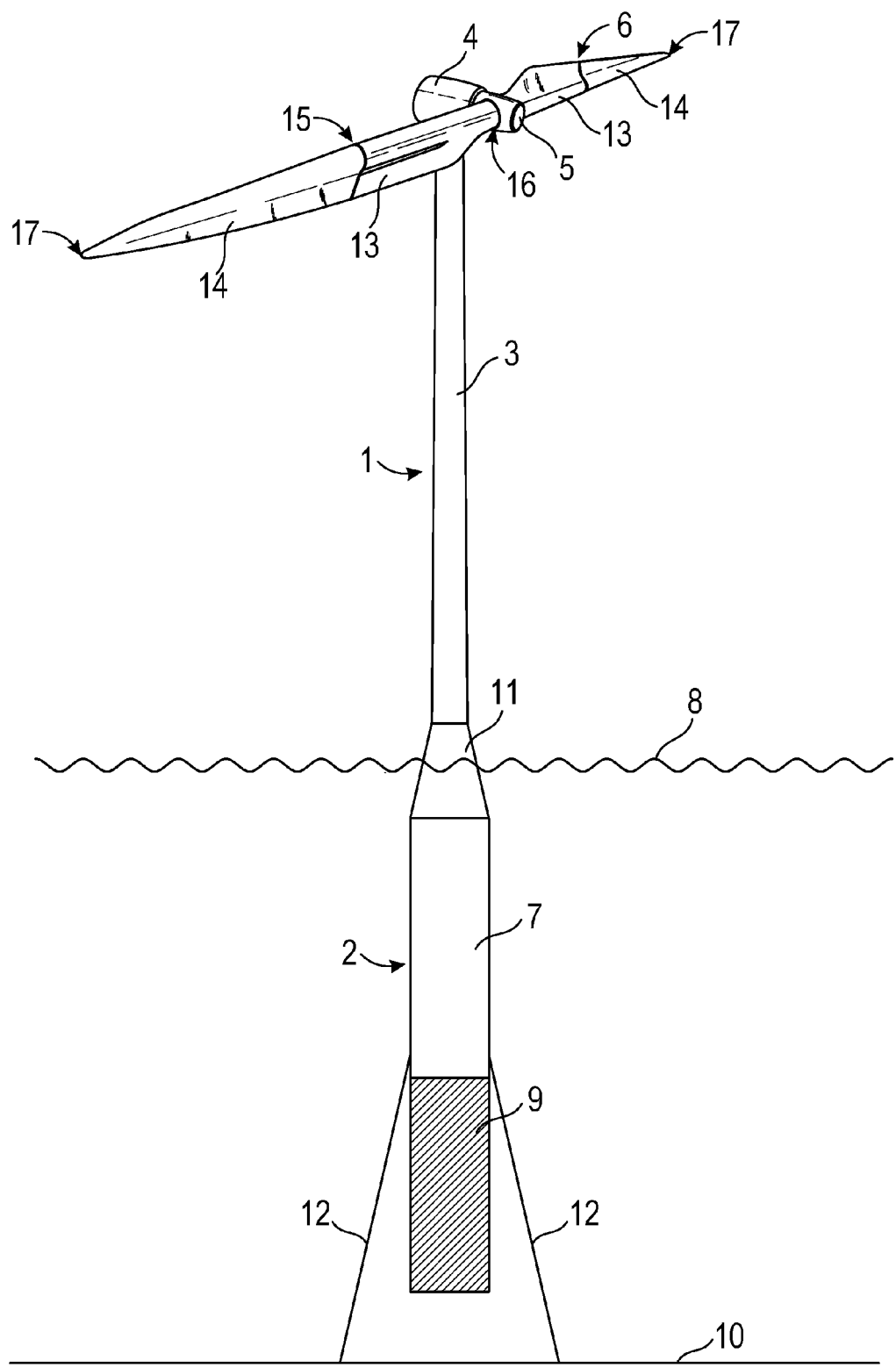
FIG. 1 shows an exemplary embodiment of a wind turbine installed on a floating foundation.

FIG. 1 shows an exemplary embodiment of a wind turbine 1 mounted on a floating foundation 2. The wind turbine 1 may comprise a wind turbine tower 3 having a bottom facing the foundation 2 and a top facing away from the foundation. One or more tower sections (not shown) mounted on top each other may form the wind turbine tower 3. A nacelle 4 may be provided on the top of wind turbine tower 3. A rotor hub 5 may be coupled to the nacelle 4, e.g. via a rotor shaft (not shown) which at one end is mounted to the rotor hub 5 and at the other end is rotatably mounted to a generator (not shown) arranged inside the nacelle 4. One or more wind turbine blades 6 may be mounted to the rotor hub 5 wherein the wind turbine blades 6 form a rotor plane. At least two or three wind turbine blades 6 are preferably mounted to the rotor hub 5, as shown in FIG. 1.

At least one yawing mechanism comprising at least a yawing bearing (not shown) may be arranged at the top of the wind turbine tower 3. The nacelle 4 may be coupled to the yawing mechanism which may be configured to actively or passively yaw at least the nacelle 4 relative to the wind turbine tower 3 so that the rotor plane is moved into the wind. This allows the rotor plane to be positioned substantially perpendicularly to the main wind direction.

The floating foundation 2 may comprise a buoyant body 7 configured to be partly or fully submerged below the water surface 8. The body 7 may comprise at least one buoyant chamber 9 in the form of a ballast chamber configured to be at least partly filled with a ballast material. The ballast material may be a liquid in the form of water, e.g. seawater, or a solid in the form of rocks, sand/gravel, concrete, metal or another suitable material. The body 7 may be shaped as an elongated and/or cylindrical body where the buoyant chamber 9 may be positioned in the lower section of the body 7. The upper section of the body 7 may be hollow and may be filled with a gaseous material, such as air, helium or another suitable gaseous material. The body 7 may form a closed body 7 wherein the gaseous material and/or the ballast material is contained inside the body 7. The body 7 may have a first end facing the water level 8 and a second end facing the seabed 10. An upper section 11 may be arranged at the first end and may be configured to be mounted to the bottom of the wind turbine tower 3. The body 7 may be made of iron, steel or another suitable material.

Means for adjusting the amount of ballast and/or gaseous material, e.g. a pump system, may be arranged on the floating foundation 2. This allows the buoyant body 7 of the floating foundation 2 to be positioned at a predetermined depth below the water level 8, e.g. so that the upper section 11 is partly submerged below the water level 8, as shown in FIG. 1. Alternatively, the upper section 11 may be positioned above the water level 8 for service or maintenance purposes or positioned below the water level 8 for added stability of the wind turbine 1, e.g. during extreme loads in form of storms, typhoons, or the like.

The floating foundation 2 may be configured to be installed at an offshore position having a water depth of about 40 m or more. The floating foundation 2 may be positioned about 5 m or more below the water level 8 measured from the centre of gravity or middle of the body 7. The floating foundation 2 may also be positioned so that the first end of the body 7 is positioned about 5 m or less from the water level 8. One or more anchoring means 12 in the form of two, three or more anchoring cables or other suitable anchoring mechanisms or systems may be configured to hold the floating foundation 2 and thus the wind turbine 1 in its position. The anchoring cables may be coupled to the floating foundation 2 and one or more anchoring supports (not shown) placed or secured to the seabed 10.

The wind turbine 1 may be configured as a partial pitch wind turbine, as shown in FIG. 1, where at least one of the wind turbine blades 6 comprises at least two blade sections 13, 14. The wind turbine blade 6 may comprise an inner blade section 13 coupled to an outer blade section 14 by a pitch junction 15. The inner blade section 13 may comprise a blade root 16 which faces the rotor hub 5 and is configured to be mounted to the rotor hub 5 by fastening means, such as bolts/nuts or the like. The outer blade section 14 may comprise a tip end 17 which faces away from the rotor hub 5.

The pitch junction 15 may be configured to pitch the outer blade section 14 relative to the inner blade section 13. A pitch mechanism (not shown) in the form of a mechanic, hydraulic or electrical unit may be arranged at the pitch junction 15. A pitch control system (not shown) may be coupled to the pitch mechanism and may be configured to regulate the pitch of the outer blade section 14. This allows the outer blade section 14 to be pitched into or out of the wind. FIG. 1 shows the blade sections 13, 14 in an unpitched position where the cross-sectional profiles of the two blade sections 13, 14 at the pitch junction 15 are aligned with each other. The pitch mechanism may be configured to pitch the outer blade section 14 between 0 and 90° relative to the inner blade section 13.

The wind turbine blade 6 can be made of fibre reinforced plastics or composites forming a laminate, wherein the fibres can be made of glass, carbon, or organic fibres. The laminate can be infused by using a resin, e.g. epoxy, supplied by an external system, e.g. a vacuum infusion or injection system.

Figure 2:
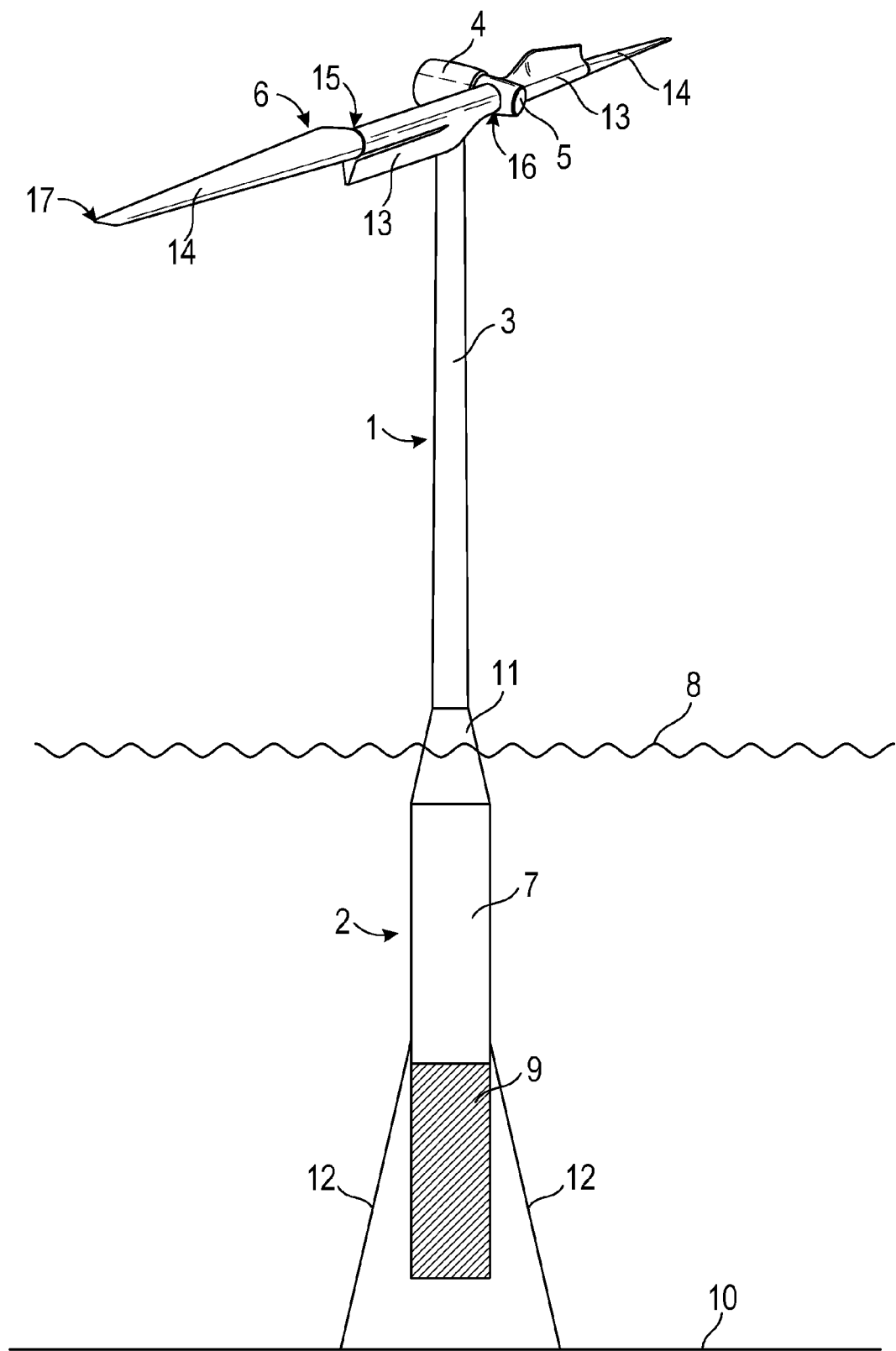
FIG. 2 shows the wind turbine shown in FIG. 1 with the outer blade section pitched relative to the inner blade section.

FIG. 2 shows the wind turbine 1 with the outer blade section 14 pitched relative to the inner blade section 13. The pitch control system may be configured to regulate the pitch of the outer blade section 14 relative to the inner blade section 13 according to a selected power output profile or a constant thrust value. The two blade sections 13, 14 provides a better control of the bending moment induced in the structure which in turn reduces the tilting movement experienced by the wind turbine 1 and/or the floating foundation 2. The pitch control system may be activated at wind speeds above a predetermined mean wind speed of 10 to 14 m/s, e.g. 12 m/s or more. This allows for a more linear control of the bending moment induced in the structure due to the size and weight of the nacelle 4 and the wind turbine blades 6. The outer blade section 14 may be pitched so that the wind turbine 1 tilts no more than ±2° relative to its vertical position.

The inner blade section 13 may have a stall-controlled aerodynamic profile defined by a predetermined set of specifications providing a first thrust value. The outer blade section 14 may have a pitch-controlled aerodynamic profile defined by a predetermined set of specifications providing a second thrust value. The first and second thrust values of the two blade sections 13, 14 may define a resultant thrust value acting on the rotor hub 5. The pitch control system may be configured to use the first thrust value as a reference parameter when regulating the second thrust value by pitching the outer blade section 14.

The inner blade section 13 may extend from the root end 16 to a position of the pitch junction 15 and define an inner swept area. The outer blade section 14 may extend from the tip end 17 to the position of the pitch junction 15 and may define an outer swept area. The inner and outer swept areas define a total area swept by the wind turbine blades 6. The relative length of the two blade sections 13, 14 may define the ratio between the outer swept area relative to the inner swept area.

The wind turbine blade 6 may have a length of 35 m or more from root end 16 to the tip end 17, corresponding to a relative length of 1. The pitch junction 15 may be positioned at a relative length between 0.20 and 0.80±10% relative to the root end 17. The inner blade section 13 may have a relative length between 0.20 and 0.80±10%. The outer blade section 14 may have a relative length between 0.20 and 0.80±10%.

The aerodynamic profile of the inner blade section 13 may form the suction and pressure sides of the blade section which define a first surface area. The aerodynamic profile of the outer blade section 14 may form the suction and pressure sides of the blade section which define a second surface area. The two surface areas may define the lift and drag forces of the two blade sections 13, 14. The thickness distribution and/or the chord distribution of each blade section 13, 14 may define the ratio between the first surface area relative to the second surface area, which can be between 0.5 and 1.5±10%.

At least one measuring unit (not shown) in the form of an accelerometer, a GPS unit, an angular sensor or another suitable measuring unit may be electrically coupled to the pitch control system. The measuring unit may be configured to measure the tilting of the wind turbine 1 relative to its vertical position. The pitch control system may be configured to regulate the pitch of the outer blade section 14 based on the measured tilt. Alternatively or additionally at least one other measuring unit in the form of an anemometer, a meteorological mast, a tachometer or another suitable measuring unit may be electrically coupled to the pitch control system. The measuring unit may be configured to measure the wind speed and/or the rotor speed of the drive train in wind turbine 1. The pitch control system may be configured to regulate the pitch of the outer blade section 14 based on the tilt of the wind turbine 1 and/or the wind speed hitting the rotor plane so that the wind turbine 1 compensates for not only for the thrust induced by the wind speed but also the thrusts induced by the marine currents and waves.

Figure 3:
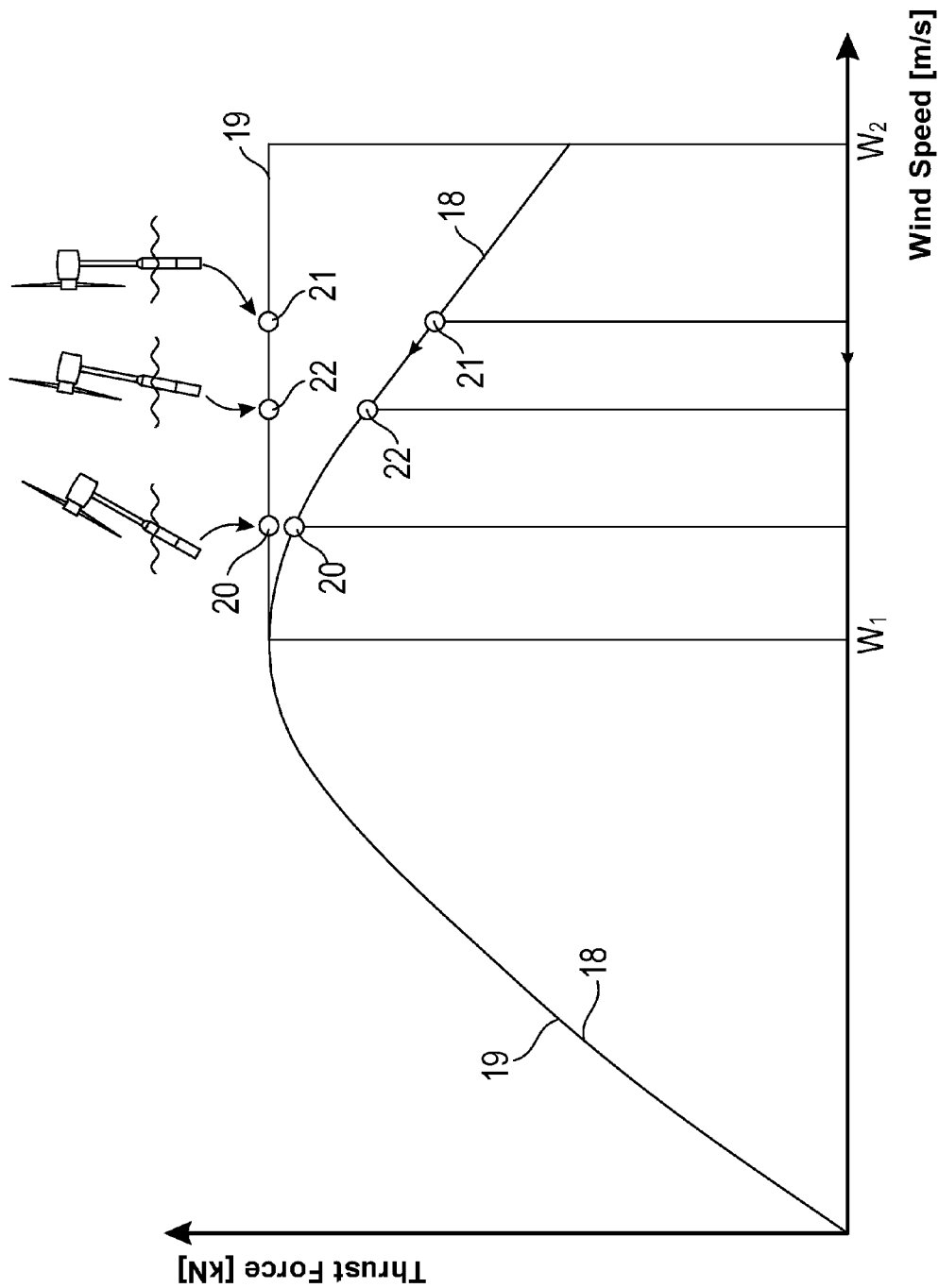
FIG. 3 shows a graph of the thrust acting on the rotor hub relative to the wind speed for a wind turbine according to the invention compared to a traditional pitch-regulated wind turbine.

FIG. 3 shows a graph of the thrust acting on the rotor hub 5 relative to the wind speed for the wind turbine 1 according to the invention compared to a traditional pitch-regulated wind turbine.

At wind speeds below the first wind speed $W_1$, the outer blade section 14 may be positioned in its unpitched position, e.g. pitch angle of zero. The thrust 18, 19 acting on the rotor hub 5 may increase as the wind speed hitting the rotor plane and the wind turbine 1 increases. As the wind speed increases above the first wind speed $W_1$ the pitch control system activates the pitch mechanism which then regulates the pitch angle of the outer blade section 14. The first wind speed $W_1$ may define the wind speed at which the wind turbine 1 reaches its rated power output. If the wind speed increases above a second wind speed $W_2$ the wind turbine activates its extreme load procedure and uncouples the wind turbine 1 from the power grid. The second wind speed $W_2$ may define the cut-off wind speed of the wind turbine 1. The first wind speed $W_1$ may be between 10 to 14 m/s, e.g. 12 m/s or more. The second wind speed may be 25 m/s or more.

The pitch control system regulates of the pitch of the outer blade section 14 relative to the inner blade section 13 so that the wind turbine blade 6 maintains a substantially constant resultant trust value. The first curve 18 defines the thrust value expired by a traditional pitch-regulated wind turbine when pitching the entire wind turbine blade. The second curve 19 defines the resultant thrust value experienced by the wind turbine 1 according to the invention. A first point 20 may define a position where the wind turbine 1 is in a tilted position while a second point 21 may define a position where the wind turbine 1 is in an untilted position, as illustrated in FIG. 3. A third point 22 may define an intermediate position where the wind turbine 1 is pitching into the wind so that the thrust value 18, 19 moves/changes from the second point 21 towards the first point 20.

As illustrated in FIG. 3, the pitching of the outer blade section 14 relative to the inner blade section 13 provides a more linear control of the bending moment induced in the structure due to the size and weight of the nacelle 4 and the wind turbine blades 6. The pitch control system may use the first thrust value of the inner blade section 13 as a reference parameter when regulating the pitch of the thrust value of the outer blade section 14. This allows the pitch control system to maintain the resultant thrust value acting on the rotor hub 5 at a substantially constant value which reduces the tilting movement of the wind turbine 1 and thus reduces the bending moment induced in the structure. As illustrated in FIG. 3, the regulation 18 of the pitch in the traditional pitch-regulated wind turbine causes the thrust value to change significantly which in turn produce large negative dampening loads and stresses in the wind turbine. These loads and stresses may be at least significantly reduced by the use of the partial pitch wind turbine 1.

The pitch control system may regulate the pitch of the outer blade section 14 based on the tilt of the wind turbine 1 and/or the wind speed hitting the rotor plane which is measured by one or more measuring units arranged on the structure, e.g. the wind turbine 1.

The resultant thrust value may be regulated to within ±10% of the constant value. The constant value may be determined at the rated wind speed, e.g. $W_1$, of the wind turbine 1 and may be between 80 and 120% of the resultant thrust value at that wind speed. The pitching may be performed by the pitch control system so that the wind turbine 1 tilts no more than ±2° relative to its vertical position.

The invention claimed is:

1. A wind turbine comprising:
   a wind turbine tower having a top and a bottom;
   a nacelle provided on top of the wind turbine tower;
   a rotor hub rotatably mounted to the nacelle;
   one or more wind turbine blades mounted to the rotor hub, wherein the wind turbine blades form a rotor plane, wherein the rotor plane is facing upwind relative to a wind direction;
   a floating foundation having a upper section configured to be mounted to the bottom of the wind turbine tower, wherein the foundation has a buoyant body and is configured to be installed at an offshore position having a predetermined water depth, wherein
   each of the one or more wind turbine blades comprises at least an inner blade section with a first aerodynamic profile and an outer blade section with a second aerodynamic profile, wherein the inner blade section has a stall-controlled aerodynamic profile and the outer blade section has a pitch-controlled aerodynamic profile, wherein the inner blade section is mounted to the rotor hub and the outer blade section is coupled to the inner blade section by at least one pitch junction,
   the wind turbine having a pitch control system which is configured to pitch the outer blade section relative to the inner blade section at wind speeds above a first wind speed, and
   wherein the wind speed acting on the inner blade sections defines a first thrust value, the wind speed acting on the outer blade sections defines a second thrust value, wherein the wind speed acting on the inner and outer blade sections defines a resultant thrust value acting on the rotor hub, and wherein the pitch control system is adapted and configured to use the first thrust value as a reference thrust value as a parameter, and wherein the pitch control system is adapted to control the pitching of the outer blade sections and the pitch control system is adapted to regulate the second thrust value relative to the first thrust value and to control the pitching of the outer blade sections so that the resultant thrust value is maintained at a substantially constant value.

2. The wind turbine according to claim 1, wherein the inner blade section extends from a root end of the wind turbine blade to a position of the pitch junction and the outer blade section extends from a tip end of the wind turbine blade to the position of the pitch junction, and wherein the pitch junction is positioned at a relative length between 0.18 and 0.88 relative to the root end.

3. The wind turbine according to claim 1, wherein the aerodynamic profile of the inner blade section defines a first surface area which defines both a suction side and a pressure side of that inner blade section, where the aerodynamic profile of the outer blade section defines a second surface area which defines both a suction side and a pressure side of that outer blade section, and wherein a ratio between the first surface area relative to the second surface area is between 0.45 and 1.65.

4. The wind turbine according to claim 1, wherein the pitch control system is configured to regulate a pitch angle of the outer blade section according to a predetermined power output.

5. The wind turbine according to claim 1, wherein the pitch control system is electrically coupled to at least one measuring unit which is configured to measure the tilting of the wind turbine tower relative to its vertical position, and wherein the pitch control system is configured to regulate the pitch of the outer blade sections based on the measured tilt.

6. The wind turbine according to claim 1, wherein the first wind speed has a mean value of 10 to 14 m/s or more.

7. A method of controlling a wind turbine comprising providing one or more wind turbine blades mounted to a rotor hub, which rotor hub is rotatably mounted to a nacelle provided on top of a wind turbine tower, which wind turbine tower is mounted to a floating foundation having a buoyant body, wherein the wind turbine blades have inner blade sections and outer sections, wherein the outer blade sections are relatively unpitched relative to the inner blade sections at wind speeds up to $W_1$ and wherein the outer blade sections increasingly are pitched relative to the inner sections at mean wind speeds above a wind speed $W_1$ to a higher wind speed $W_2$, the method further comprising regulating with a pitch control system the pitch of the outer blade sections of the wind turbine blades relative to the inner blade sections of the wind turbine blades, defining with the wind speed acting on the inner blade sections a first thrust value, and defining with the wind speed acting on the outer blade sections a second thrust value, which is used as a reference thrust value and a reference parameter for pitching the outer blade sections, defining with the wind speed acting on the inner and outer blade sections a resultant thrust value acting on the rotor hub, and wherein the pitch control system is adapted to regulate the second thrust value relative to the first thrust value by pitching the outer blade sections relative to the inner blade sections so that the resultant thrust value is maintained at a substantially constant value.

8. The method according to claim 7, wherein the pitching is further regulated relative to a predetermined power output.

9. The method according to claim 7, wherein at least one measuring unit arranged on the structure measures the tilting of the wind turbine tower, and wherein the pitching of the outer blade sections are further regulated based on the measured tilt.

10. The wind turbine according to claim 1, wherein the pitch junction is positioned at a relative length between 0.27 and 0.77 relative to the root end.

11. The wind turbine according to claim 1, wherein the ratio between a surface area of the outer blade parts relative to a surface area of the inner blade parts is between 0.5 and 1.

* * * * *